Figure 1:
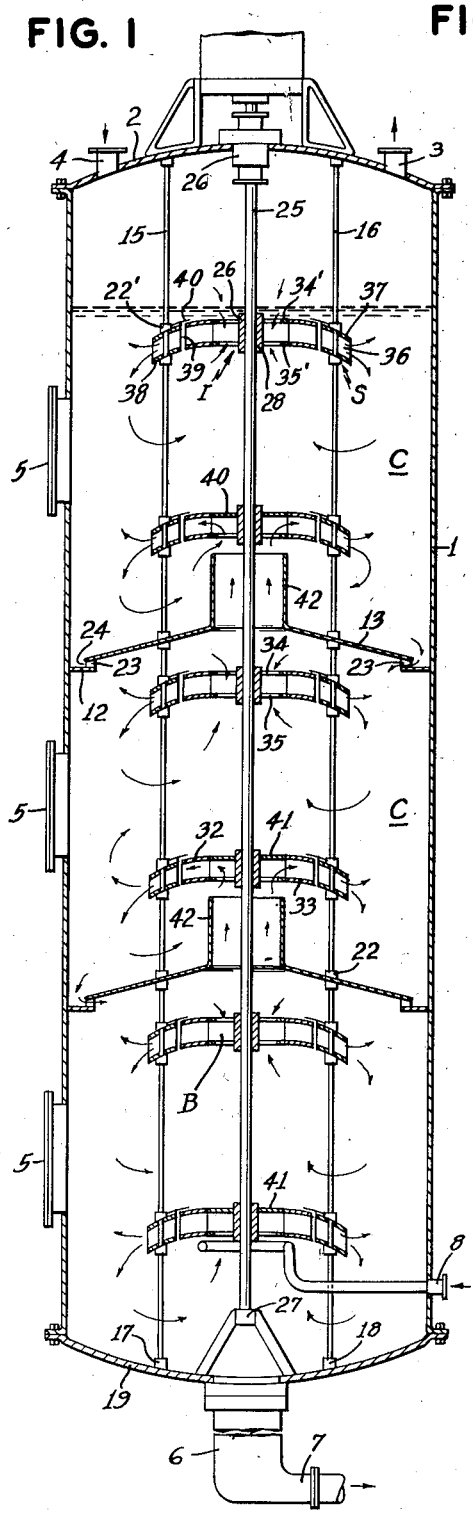

Oct. 28, 1952          K. S. VALENTINE          2,615,698
APPARATUS FOR DISPERSING GASES IN LIQUIDS
Filed Dec. 28, 1950

INVENTOR
Kenneth Sterling Valentine
BY
Pennie, Edmonds, Morton & Barrows
ATTORNEYS

UNITED STATES PATENT OFFICE 2,615,698

APPARATUS FOR DISPERSING GASES IN LIQUIDS

Kenneth Sterling Valentine, New York, N. Y., assignor to The Patterson Foundry & Machine Co., New York, N. Y., a corporation of Ohio Application December 28, 1950, Serial No. 203,098

2 Claims. (Cl. 261—93)

This invention relates to the mixing or dispersion of gases in liquids and has for its object the provision of an improved apparatus and method for this purpose. While my invention has general applicability to the mixing of gases and liquids, it is particularly advantageous in gas absorption and hydrogenation in continuous operations.

The invention provides a method for passing a liquid and a gas through a container in which several stages of intermixing take place, each stage effecting a shearing or subdivision of the liquid and gas in a movement in which the liquid undergoes repeated circulations before moving to the next stage. The invention is particularly efficacious in countercurrent systems in which the liquid is introduced at the upper part and the gas at the lower part of the container, and the treated liquid is removed at the bottom.

The apparatus of my invention preferably comprises an elongated upright container for the liquid divided into a plurality of stages or compartments in each of which is mounted a dispersion means, advantageously an impeller-stator unit of my invention, preferably a plurality of the units, to effect a circulation and intimate intermixing of the gas and liquid.

The invention preferably provides an impeller in each compartment arranged to discharge more or less laterally and radially a stream of gas and liquid into a surrounding dispersion means. An impeller-stator unit of my invention fulfills the dispersion requirements very effectively and is characterized by an impeller and stator, each covered or shrouded top and bottom with more or less horizontally disposed and spaced plates, mounted in side-by-side relation and having contiguous lateral spaces for the flow of liquid and gas. The impeller has centrally disposed openings for the entrance from below and above of the liquid and gas mixture which is sucked into the central part of the impeller and forced to flow through the lateral spaces in the impeller and stator. The plates are preferably curved downwardly at their peripheries and the liquid and gas are forced to flow in a downward and outward direction. The invention comprises any suitable means to vary the sizes of the openings to control the flow of liquid and gas. The impeller-stator units of my invention are more particularly described and claimed in my copending application Serial Number 132,231, filed December 10, 1949.

The various stages are separated from each other by baffle or partition means which permits passage of gas and liquid from stage to stage but controls the circulation of liquid and gas at each stage. In an advantageous embodiment of the invention, each baffle means comprises an annular plate extending from the wall of the container inwardly and having a central opening over which is mounted a conical member with an upwardly extending chimney. The conical member is preferably suspended in spaced relation with respect to the annular plate providing a narrow annular passageway for the downward flow of liquid to the next stage, and the chimney is arranged to direct the rising gas into the lower opening in the impeller directly above. The conical member is preferably supported by adjustable members on the annular plate and held any suitable distance above to provide an annular narrow aperture, say, around one inch in depth, to control the flow of liquid to the compartment below.

The interior mechanism including the impeller-stator units and the baffles are mounted on a supporting means such as rods, whereby on removal of the cover for the container the entire mechanism may be lifted out. The impeller-stator units and baffles are preferably mounted on the supporting rods by means which permit adjustments upward and downward. The container may have any desired number of manholes to provide access to the various adjustable members.

In certain operations of the invention, such as in the hydrogenation of oils and fats, it is desirable to maintain the gas in a finely dispersed state and in contact with the liquid as long as possible before it rises to the surface and breaks out of the liquid. It is also often desirable for the liquid phase to capture or recapture gas from the space above the liquid. Further it is often desirable for gas which has risen to a higher level within the vessel to be transferred to a lower level. The method of the invention achieves these objectives by providing separate zones of agitation in each of which the liquid and gas are circulated over and over again in a radially outward and radially inward movement while controlled portions of the mixture of liquid and gas are progressively moved downward and a part of the gas moves upward. In at least some of the stages, the radially moving outward stream divides, a primary part turning downward and inward while a secondary part turns upward and inward in consequence of which gas that would otherwise escape is recaptured and the fluid is subjected to repeated circulations in each of which the liquid and gas are sheared and violently intermixed resulting in very effective dispersion of the gas.

One important feature of the invention is that the liquid in the upper stage undergoes a vortex-like action at the surface resulting in a sucking of gas from above the liquid back into the liquid for recirculation. The lowermost stage is preferably maintained in a relatively quiescent state to facilitate separation of gas from the treated exiting liquid.

Figure 2:
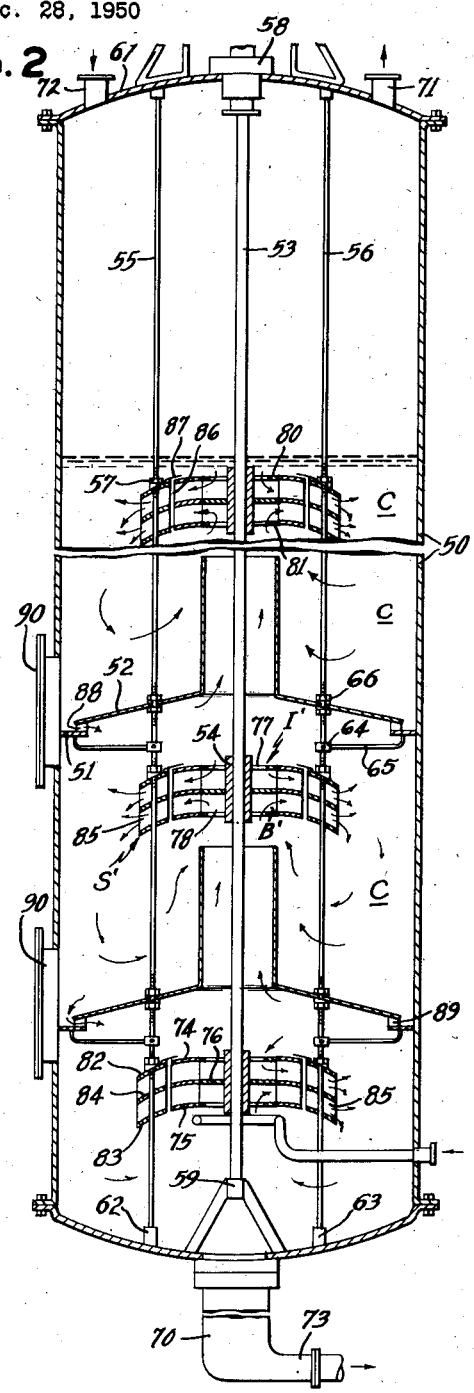

These and other objects of the invention will be better understood after considering the following discussion taken in conjunction with the accompanying drawings, in which:

Fig. 1 is an elevation of apparatus embodying the invention with parts shown in section, and Fig. 2 is an elevation of another embodiment of the invention with parts shown in section and other parts removed.

The apparatus illustrated in Fig. 1 comprises a container 1 having a cover 2 in which are provided an outlet port 3 for the escape of gas and an inlet port 4 for the introduction of liquid. A plurality of conveniently located manholes with covers 5 are provided in the side wall. At the bottom a relatively smaller chamber 6 is provided to permit separation of gas from the liquid removed from the system through the pipe 7. The gas to be dispersed into the liquid is introduced into the lower portion of the container through the pipe 8.

The interior of the container is divided into any desired number of stages or compartments C by transversely disposed baffles, each consisting of an annular plate 12 and a conical member 13. In each of the compartments, two impeller-stator units are mounted each consisting of an impeller I and a stator S.

The upright rods 15 and 16 are attached to the cover 2 at their upper ends and are secured at their lower ends in openings in the blocks 17 and 18 attached to the bottom 19. The stators and conical baffles are adjustably attached to the rods by sleeves or brackets 22 and 22' which can be secured in any desired position on the shaft by set screws or like means (not shown). The annular baffles 12 are adjustably connected to the conical baffles 13 by spacing blocks 23 by means of which the narrow annular apertures 24 between the baffles may be varied in size.

The upright shaft 25 passes through the stuffing box 26 in the cover and is secured in position at its lower end in the bearing 27. The impellers I are each secured in position to the shaft by the hub 28. Each hub can be adjusted upward or downward and secured in the desired position by set screws or like means (not shown). The entire assembly of elements comprising the impeller-stator units, the annular and conical baffles, rods, and shaft may be removed from the container and replaced as a unitary structure merely by removal and replacement of the cover.

The impeller of each unit comprises upper and lower plates 32 and 33 downwardly curved at their peripheries and impeller blades B attached to the hub and between the plates. The upper impeller of each compartment has variable openings 34 and 35 at the top and bottom for the entrance of fluid. These openings may be adjusted in size by rings 34' and 35' or means more particularly described in my said copending application. The stators are in the shape of annular members comprising a plurality of radially disposed shearing blades 36 supported between upper and lower cover plates 37 and 38 respectively. A relatively narrow clearance space 39 is provided between the periphery of the impeller and the inner edge portions of the stator blades 36. In order to prevent an upward passage of gas through the space, the shrouds 40 are attached to the stators and overlap the upper plates of the impellers.

In at least some of the impellers, preferably the lowermost one of each compartment, the upper opening of the impeller is closed completely with a plate 41 to prevent the direct upward passage of gas into the liquid above. Otherwise, these impellers are identical to the upper impellers.

Each conical baffle preferably has a central opening over which is mounted a cylindrical member 42 or chimney for directing the passage of gas from one compartment upwardly into the lower opening of the impeller directly above. The chimney accordingly insures that the gas which rises in the liquid must enter the impeller and undergo the shearing action in contact with the blades 36.

A typical operation carried out in the apparatus of Fig. 1 is as follows: Liquid or a liquid-solid mixture enters through the top port 4 continuously and a liquid level is maintained preferably just above the top impeller. Gas enters through the gas distributor located under the bottom impeller. The area of the apertures 24 between the baffles should be kept only as large as is necessary to satisfy the rate of liquid throughput, since it is desirable to retard a too rapid downward flow of liquid from one compartment to the next. The impellers maintain a vigorous rate of circulation in the general direction indicated by the arrows. Since the lower impeller in each compartment is covered with a plate, all the gas is drawn through the impeller with the liquid. The high degree of dispersion results from the shearing action produced on the mixture by the rapidly rotating impeller and the stationary deflecting or shearing blades of the stator. Due to the curved or dome-like shape of the impeller and stator cover plates, the primary direction of discharge is downward and outward and back into the lower opening of the impeller. The secondary direction of the mixture is upward and inward and back into the top opening of the impeller. Gas unabsorbed in the lower compartment rises to the top of that compartment where the mixing action is intentionally made of lesser degree. Therefore, the gas particles have a tendency to coalesce and to rise under the cone and to pass up the chimney. Thus the movement of gas relative to the compartments is upward and this upward movement of gas is aided by the suction of the impeller immediately above each chimney. A relatively small amount of liquid will also be drawn up with the gas, but this is in the nature of a recirculation of the liquid and is therefore only an additional means of retarding liquid flow downward. A space is allowed at the top of the container above the liquid level for gas disengagement. The chief objective is to hold the gas down as long as possible to counteract its natural tendency to rise quickly to the surface.

The impeller-stator units cause multiple recirculations of the liquid and gas mixture over the paths described. The upper impeller in each compartment has both top and bottom intakes. It furnishes additional means of circulating liquid and gas mainly in the same path described above and means of reshearing gas and liquid for the purpose of redispersing the gas in the liquid. The upper impeller in the top compartment is usually so located and the impeller blades so set that it will induce a vortex and cause a flow of gas from the space above the liquid level and remix it with the liquid.

Thus, in a six-impeller-stator unit system, for example, vigorous and repeated mixing, shearing and dispersing take place at six levels in the vessel and at two levels in each compartment. At preferred working speeds, the combined circulating rate of all impellers is twenty to twenty-five times the volume of the vessel per minute. This high rate is most desirable for continuous systems since it insures a more nearly average quality of the finished product discharged from the apparatus.

The apparatus illustrated in Fig. 2 comprises a container 50 in which are a plurality of compartments C varying in number, say, from 3 to 18, and divided one from the other by annular baffles 51 and conical baffles 52. Within each compartment is an impeller-stator unit comprising an impeller I' attached to the drive shaft 53 by hub 54 and a stator S' attached to the rods 55 and 56 by nuts 57. Shaft 53 passes through stuffing box 58 and is mounted in bearing 59 at the bottom. Rods 55 and 56 are attached to the cover 61 and are mounted in blocks 62 and 63 and at the bottom. The annular baffles 51 are attached to the rods 55 and 56 by the brackets 64 and arms 65, the conical baffles 52 are attached to the rods by nuts 57, and the entire assembly of elements within the container is removable as a unitary structure, as in the case of the apparatus of Fig. 1. Moreover, the impeller-stator units and conical and annular baffles are each adjustably secured in position by the hub and brackets or nuts as are the corresponding elements of Fig. 1. The apparatus of Fig. 2 also includes a connected receptacle 70 at the bottom for receiving a body of the treated liquid and maintaining it in a relatively quiescent condition for the separation of gas therefrom and a relatively large chamber portion at the top of compartment C above the level of liquid in which the gas escapes from the liquid and is confined before passing out of the bleeder or outlet port 71. The liquid to be treated is introduced into the container through the inlet port 72 and the treated liquid is removed through the duct 73. The impeller-stator units are double and in that respect differ from those of Fig. 1.

The impeller comprises a plurality of radially disposed blades B' attached to the hub 54 with upper and lower cover plates 74 and 75 attached to the exterior edges and a partition 76 midway between the plates. The impeller has upper and lower openings 77 and 78, respectively, for the entrance above and below of the liquid and gas mixture. These openings may be provided with adjustable means to vary the size of the opening, such as the removable rings 80 and 81. It will be noted that the upper and lower plates and partition are curved downwardly toward their peripheries.

The stators S' have upper and lower plates 82 and 83, respectively, and a partition 84. A plurality of radially disposed shearing blades 85 are mounted between the plates 82 and 83. The plates and partition of the stator are in substantially mating relation with the corresponding elements of the impeller and are curved as continuations thereof. The narrow space 86 between the impeller and the stator is covered with a shroud 87 to prevent an upward movement of gas therebetween.

The impeller-stator units of Fig. 2 being of a double type take the place of the two single stator units of Fig. 1. In addition to the adjustability provided by the removable rings 80 and 81 having different inner diameter openings, the partitions 84 may have similar variable openings at the hub for controlling the upward flow of liquid and gas from one stage to the next. The conical baffles 52 are also adjustably connected to the annular baffles 51 by the blocks or spacers 88 to vary the sizes of the apertures 89. Any suitable number of manhole openings and covers 90 may be employed.

The apparatus of Fig. 2 is operated in a manner similar to the apparatus of Fig. 1 and the liquid also moves in the direction of the arrows. A sufficient number of stages or compartments is used to effect the desired absorption or reaction of the gas dispersed in the liquid and the operation is preferably carried out continuously.

In the hydrogenation of an oil with hydrogen gas, for example, the method and apparatus of the invention are especially effective. The hydrogenation of an oil such as cottonseed to a lard, such as Crisco, is very difficult to accomplish on a continuous basis because the reaction is only partial, the hydrogen absorbed being only about one-third of the amount necessary to saturate the oil. In the usual case, where a reaction goes all the way to completion, it is not harmful if a considerable proportion of the oil or other liquid remains in the system several times as long as is necessary to complete the reaction. The only concern in the usual case is to keep all or most of the material in the system for a sufficiently long time to react almost completely. But to accomplish a partial reaction as in making lard from cottonseed oil, practically all of the oil must remain in the system for the required time.

I have found that a multiplicity of the circulations according to the invention, for example twenty or more, will accomplish very effective results. It is accordingly contemplated to use several of the containers connected in series, for example four containers, each having nine compartments or stages. Liquid and catalyst will flow through all 36 stages but fresh hydrogen will be entered at the bottom of each container.

In an operation for producing a lard like Crisco at the rate of 415 gallons per hour from cottonseed oil in a reaction time of one hour, I use a system having a holding capacity of about 415 gallons. Each container shall be approximately 15 inches in diameter and 9 feet 6 inches in height. The impellers shall be 6 inches in diameter and rotate at 675 R. P. M.

I claim:

1. Apparatus for the dispersion of a gas in a liquid which comprises an upright elongated container with means at the upper portion for introducing a liquid and discharging gas and means at the lower portion for introducing the gas and removing the treated liquid, a plurality of baffle means extending across the container in spaced relation forming compartments therebetween, at least one impeller-stator unit in each compartment comprising an impeller having central inlet openings at the top and bottom, the impeller being rotatable on an upright shaft, means located adjacent the periphery of the impeller to shear the liquid and gas to effect dispersion of the gas in the liquid, an annular aperture near the outer periphery of each baffle for the downward passing of liquid near the sides of the container, and a central chimney for each baffle for directing the upward flow of gas into the central inlet opening of the impeller-stator unit directly above.

2. Apparatus for the dispersion of a gas in a liquid which comprises an upright elongated container with means at the upper portion for introducing a liquid and discharging gas and means at the lower portion for introducing the gas and removing the treated liquid, a plurality of baffle means extending across the container in spaced relation forming compartments therebetween, at least one impeller in each of a plurality of compartments, means for drawing liquid and gas into centrally located top and bottom inlet openings for the impeller, said baffle means comprising an annular baffle extending inward from the wall of the container having an open center, a conical baffle with an opening at the apex suspended above the annular baffle providing an annular aperture for the flow of liquid from one compartment to the compartment below, means for adjusting the relative positions of the baffles to vary the sizes of the apertures, said opening at the apex of the conical baffle being directly below the bottom inlet opening of the impeller, whereby rising gases passing through the opening at the apex pass directly into the bottom inlet opening of the impeller.

KENNETH STERLING VALENTINE.

REFERENCES CITED

The following references are of record in the file of this patent:

UNITED STATES PATENTS

| Number | Name | Date |
| --- | --- | --- |
| 1,856,120 | Valentine | May 3, 1932 |
| 1,949,696 | Schoneborn | Mar. 6, 1934 |
| 2,154,150 | De Becze | Apr. 11, 1939 |
| 2,165,889 | Fischer et al. | July 11, 1939 |
| 2,257,533 | Reich | Sept. 30, 1941 |